United States Patent [19]
Bolth et al.

[11] 3,907,854

[45] Sept. 23, 1975

[54] DIALKYL THIONOCARBAMATE METHOD

[75] Inventors: Franklin Anderson Bolth, Baltimore, Md.; Ronald David Crozier, Bedford, N.Y.; Lawrence Evans Strow, Baltimore, Md.

[73] Assignee: Minerec Corporation, New York, N.Y.

[22] Filed: July 13, 1973

[21] Appl. No.: 379,114

[52] U.S. Cl. ............... 260/455 A; 252/61; 209/166
[51] Int. Cl.$^2$ ...................................... C07C 155/02
[58] Field of Search ............................. 260/455 A

[56] References Cited
UNITED STATES PATENTS 2,691,635  10/1954  Harris et al. ................... 260/455 A
2,723,989  11/1955  Harman ......................... 260/455 A

OTHER PUBLICATIONS

Bögemann et al., Schwefel-, Selen-, Tellur-Verbindungen, 1955, p. 832.

*Primary Examiner*—Elbert L. Roberts
*Assistant Examiner*—D. R. Phillips
*Attorney, Agent, or Firm*—James J. Burke, II

[57] ABSTRACT

High-purity dialkyl thionocarbamates are economically produced by reacting suitable xanthates with alkyl amines in the presence of a dissolved catalyst. Nickel and palladium salts are preferred catalysts. Thionocarbamates produced by the method of the invention are a desirable flotation reagent for certain refractory copper sulfide ores.

13 Claims, No Drawings

DIALKYL THIONOCARBAMATE METHOD

BACKGROUND OF THE INVENTION

1. Field of the Invention

The present invention relates generally to the production of dialkyl thionocarbamates, also sometimes referred to as thiourethanes. Compounds of this type are defined by the general formula

where R and R' are alkyl radicals. These products are known to be useful as flotation reagents in the recovery of minerals from ores and concentrates.

In its more specific aspects, the present invention relates to the production of high purity dialkyl thionocarbamates from an alkali metal xanthate and an amine in a one-stage, catalyzed reaction. It has been determined, for example, that isopropyl ethyl thionocarbamate made by the process of the present invention is a superior flotation reagent for certain ores, when compared to a commercial grade of the same reagent.

2. Prior Art

The production of dialkyl thionocarbamates, and their use as flotation reagents, is well known in the art. In essence, an alkali metal xanthate is first reacted with an alkyl halide to form a dialkyl xanthate. This is then reacted with an aliphatic amine to produce the desired compound and a mercaptan. The latter can be distilled off, and the organic and aqueous phases separated. In practice, however, problems arise.

In the initial formation of the alkali metal xanthate by reaction of an alkali metal hydroxide with carbon disulfide and an aliphatic alcohol, temperatures must be closely controlled to avoid significant trithiocarbonate formation. Close temperature control is also necessary in the intermediate reaction with an alkyl halide. The amine is then introduced and, after reaction, the organic reaction product is recovered. However, this is said to contain only 50–90% of the desired ester, the remainder being mainly alkyl dithiocarbamate, dialkyl xanthate and dialkyl trithiocarbonate.

In the prior art, the selection of reaction conditions always involved a trade-off between obtaining a reasonable reaction rate and yield of desired product. High temperatures improved reaction rate but also encouraged side reactions and decomposition of xanthate. The same is true of long reaction times. In one regard, the present invention is surprising in using both higher temperatures and longer times than would be taught by the conventional wisdom, while still producing a high purity product.

Prior workers have argued that such an impure ester is advantageous, in that costly and time consuming purification steps are avoided. It is said that no benefit is gained by isolating and purifying the intermediates, so that a pure ester could be obtained. Such purification steps would indeed be costly, but in accordance with the present invention, a high purity product is obtained and the only purification needed is washing with water.

OBJECT OF THE INVENTION

It is a general object of the present invention to provide an improved process for producing dialkyl thionocarbamates.

A further object of the present invention is to provide a process for producing dialkyl thionocarbamates of high purity.

Another object of the present invention is to provide a process for producing high purity dialkyl thionocarbamates wherein contamination by intermediate reaction products is avoided.

A still further object of the present invention is to provide improved dialkyl thionocarbamates which are useful as flotation reagents for ores and concentrates.

Various other objects and advantages of the invention will become clear from the following description of embodiments thereof, and the novel features will be particularly pointed out in connection with the appended claims.

DESCRIPTION OF EMBODIMENTS

In essence, the present invention is based on our discovery that compounds of the type described can be produced with good yield and in high purity form by directly reacting the xanthate and an alkyl amine in the presence of a catalyst. The preliminary reaction with an alkyl halide is thus eliminated. As catalysts, nickel salts are operable but palladium salts are preferred. As set forth more fully hereinbelow, differing reaction conditions are required for each salt. In the course of the process the catalyst material may be recovered for recycling; this is economically essential, however, only in the case of the palladium salt.

In carrying out the invention, a technical grade of xanthate is prepared by conventional means. For example, sodium hydroxide, carbon disulfide and isopropyl alcohol are reacted under appropriate conditions to form an aqueous solution of sodium isopropyl xanthate. The technical grade is actually preferred to a laboratory or reagent grade, because it generally contains excess dissolved carbon disulfide, which is believed to assist later reactions in going to completion, possibly by the law of mass action. However, more than 2% free alkali in the solution is deleterious to the reaction, and should be neutralized.

The catalyst and amine are then added to the xanthate solution. The catalyst is added in the form of a soluble salt, such as nickel sulfate, palladium chloride, palladiumamine complexes or the like. Experience indicates that less than all of the palladium salt goes into solution, but this is not a problem. The quantity of catalyst added is not deemed critical, but is generally in the range of 0.002 to 0.02 mols palladium, calculated on a formula basis, per mol of xanthate. For nickel, the preferred range is 0.01 to 0.02 mols per mol of xanthate. Additions at higher levels are neither deleterious nor beneficial.

An aqueous amine is added in stoichiometric excess not exceeding about 200% of the mols of xanthate; generally an excess of about 120% is satisfactory. Expressed differently, this is an excess of 20–100%. For practical reasons the amine is limited to a chain of 1–6 carbon atoms.

When the palladium catalyst is used, the reaction is carried out at a temperature in the range of 50° to 90°C. for periods ranging from ½ hour to 18 hours. Preferred conditions are 80°C for 16 hours in one instance. Under these conditions, it has been determined that palladium will catalyze reactions producing a wide variety of dialkyl dithionocarbamates.

When the nickel catalyst is employed, the temperature range is 60° to 90°C, the minimum reaction time is 4 hours, and the range is 4 to 18 hours. Under these conditions, the nickel is useful in reactions producing the isopropyl esters (ethyl isopropyl dithionocarbamates, methyl isopropyl dithionocarbamate, etc.).

The reaction of a lower alkyl sodium xanthate with a suitable amine may be characterized as follows:

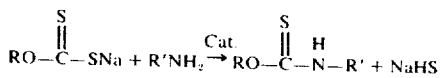

Of course, the sodium hydrosulfide byproduct is quite distinct from the mercaptan products produced by conventional procedures; it is considered that the presence of the catalyst ions and dissolved $CS_2$ provides an environment wherein the hydrosulfide is formed to the exclusion of the type of byproducts which have plagued prior workers, noted hereinabove. However, the precise reaction mechanism is not known, and is undoubtedly complex.

The aqueous phase, which is dark with sodium hydrosulfide and contains the excess amine, is separated from the organic phase by settling and decantation or any convenient technique. The aqueous phase will contain most of the catalyst, in sulfide form, and should not be discarded if recovery is contemplated.

The product oil is washed with water several times to remove isopropyl alcohol.

The resulting oil is dried by any convenient technique and is found to contain from 98 to 100% of the desired ester, in the case described isopropyl ethyl dithionocarbamate. Further, the only detectable impurity is isopropyl alcohol, and not the various intermediate reaction products of the prior art.

While nickel salts are operable as catalysts in the process for producing the isopropyl esters as described hereinabove, it has been found that yields are substantially greater when the palladium salts are employed. The reason for this is not known.

Understanding of the invention will be facilitated by reference to the following specific examples thereof, which are to be construed as illustrative only and not in a limiting sense.

EXAMPLE I

A technical xanthate solution (1500 ml.) containing 490.4 grams of sodium isopropyl xanthate was treated with 16.3 grams $NiSO_4.6H_2O$ in water and 243.7 grams of a 69.% ethyl amine solution at 80°c. for 6 hours. At the end of this time 371.5 grams of crude product was separated containing 313.7 grams of pure isopropyl ethyl thionocarbamate.

EXAMPLE II

Dissolved salts of nickel and of palladium are both useful catalysts in the preparation of isopropyl ethyl thionocarbamate. In the following table a technical xanthate solution containing 44.3 grams of sodium isopropyl xanthate was treated with 21.6 grams of 70% ethyl amine solution and the listed catalyst for 6 or more hours at 80°c.

The results were:

| CATALYST | GR. CRUDE YIELD | GR. PURE YIELD |
|---|---|---|
| none | 3.3 | 3.27 |
| 1.47 gr. $NiSO_4.6H_2O$ | 29.0 | 28.50 |
| 1.0 gr. $PdCl_2$ | 36.0 | 35.28 |

Similar results may be had with the chlorides and nitrate salts of nickel.

EXAMPLE III

Palladium chloride is useful as a catalyst in the production of all dialkyl thionocarbamates. The following table records data from a series of such preparations in which several technical xanthate solutions were reacted with 40% methyl amine solution (B) and 70% ethyl amine (A) in the presence of palladium chloride and also with no catalyst at all present. The reactions run with isopropyl xanthate were run 16 or more hours at 80° C. Those reactions that utilized the other xanthates listed were run 2 or more hours at 70°C.

| Xanthate Used | Grams of Xanthate Used | Catalyst Used | Amine Used | Yield Pct. | Purity Pct.* |
|---|---|---|---|---|---|
| Isopropyl | 44.3g. | None | B=26.1g. | 29.09 | 90.42 |
| Isopropyl | 44.3g. | $PdCl_2$-1g. | B=26.1g. | 87.88 | 95.00 |
| n-Butyl | 48.2g. | None | B=26.1g. | 53.5 | 65.0 |
| n-Butyl | 48.2g. | $PdCl_2$-1g. | B=26.1g. | 84.9 | 85.4 |
| n-Butyl | 48.2g. | None | A=21.6g. | 18.1 | 95.0 |
| n-Butyl | 48.2g. | $PdCl_2$-1g. | A=21.6g. | 73.2 | 84.3 |
| Iso-Butyl | 48.2g. | None | B=26.1g. | 60.9 | 92.7 |
| Iso-Butyl | 48.2g. | $PdCl_2$-1g. | B=26.1g. | 85.5 | 91.5 |
| Iso-Butyl | 48.2g. | None | A=21.6g. | 16.8 | 99.0 |
| Iso-Butyl | 48.2g. | $PdCl_2$-1g. | A=21.6g. | 68.9 | 96.5 |
| pri-Amyl | 52.1g. | None | B=26.1g. | 55.4 | 73.0 |
| pri-Amyl | 52.1g. | $PdCl_2$-1g. | B=26.1g. | 92.6 | 91.5 |
| pri-Amyl | 52.1g. | None | A=21.6g. | 11.8 | 91.5 |
| pri-Amyl | 52.1g. | $PdCl_2$-1g. | A=21.6g. | 78.9 | 95.0 |

*alcohol is only impurity.

The product of the process of the present invention exhibits superior properties as a flotation reagent, as set forth in the following additional examples.

EXAMPLES IV–VIII

In the following examples, comminuted refractory sulfide ores were subjected to separate froth flotation operations in the presence of the reagents indicated, but, otherwise were treated under substantially identical conditions, with the production of concentrate and tailing products of the analysis indicated.

The standard reagent referred to was a commercial isopropyl ethyl thionocarbamate, accepted at the time as being effective in treating the ores tested, but apparently containing 3 to 6% impurities.

| Test No. | IV | | | |
|---|---|---|---|---|
| | 1. | 2. | 3. | 4. |
| Ore: % Cu | 1.215 | 1.215 | 1.215 | 1.215 |
| Concentrates: % Cu | 12.98 | 12.13 | 15.00 | 15.05 |
| Tails: % Cu | .245 | .226 | .419 | .365 |
| % Recovery | 81.40 | 82.92 | 67.41 | 71.69 |
| Reagents, Pounds Per Ton | | | | |
| Standard Reagent | .06 | — | .04 | — |
| Isopropyl Ethyl Thionocarbamate | — | .06 | — | .04 |

In this test, at the higher addition level, the use of the product of the invention caused an increase in copper recovery of 1.52% with a corresponding decrease in copper values lost as tails. At the lower addition level, use of the product of the invention was even more impressive, increasing copper recovery by 4.28%.

| Test No. | V | |
|---|---|---|
| | 1. | 2. |
| Ore: % Cu | .929 | .929 |
| Concentrates: % Cu | 10.61 | 10.79 |
| Tails: % Cu | .179 | .167 |
| % Recovery | 82.13 | 83.31 |
| Reagents, Pounds Per Ton | | |
| Standard Reagent | .04 | — |
| Isopropyl Ethyl Thionocarbamate | — | .04 |

In this test, with a less-rich ore, improvement at a low level of addition amounted to 1.18%.

| Test No. | VI | |
|---|---|---|
| | 1. | 2. |
| Ore: % Cu | 1.020 | 1.020 |
| Concentrates: % Cu | 8.48 | 9.22 |
| Tails: % Cu | .236 | .214 |
| % Recovery | 79.02 | 80.88 |
| Reagents, Pounds Per Ton | | |
| Standard Reagent | .04 | — |
| Isopropyl Ethyl Thionocarbamate | — | .04 |

| Test No. | VII | |
|---|---|---|
| | 1. | 2. |
| Ore: % Cu | .869 | .869 |
| Concentrates: % Cu | 12.14 | 11.93 |
| Tails: % Cu | .176 | .154 |
| % Recovery | 80.31 | 83.31 |
| Reagents, Pounds Per Ton | | |
| Standard Reagent | .04 | — |
| Isopropyl Ethyl Thionocarbamate | — | .04 |

| Test No. | VIII | | |
|---|---|---|---|
| | 1. | 2. | 3. |
| Ore: % Cu | .897 | .897 | .897 |
| Concentrates: % Cu | 9.70 | 10.40 | 9.93 |
| Tails: % Cu | .201 | .189 | .189 |
| % Recovery | 79.26 | 80.38 | 80.49 |
| Reagents, Pounds Per Ton | | | |
| Standard Reagent | .04 | — | — |
| Isobutyl Ethyl Thionocarbamate | — | .04 | — |
| Thionocarbamate | — | — | .04 |

In tests VI–VIII, with widely varying ores, the improvement brought about by use of the product of the invention was, respectively, 1.869%, 2.41% and 1.23%. In the latter instance, it should be noted, that isobutyl esters (ethyl and methyl) were used rather than the isopropyl ethyl ester used in the other examples. Other tests have shown that the isopropyl ester is indeed to be preferred for some ores. The length of the carbon chain on the other alkyl group is not considered significant and is nominally limited to 1–6.

In the foregoing tests it is considered that the differences in purity between the standard reagent (3–6%) and the product of the invention (less than 2%) are too small to account for the improved results obtained. It is felt, therefore, that some unknown factor associated with the process of the invention must be responsible for the improvement.

Various changes in the details, steps, materials and arrangements of parts, which have been herein described and illustrated in order to explain the nature of the invention, may be made by those skilled in the art within the principle and scope of the invention as defined in the appended claims.

What is claimed is:

1. In a process for the production of dialkyl thionocarbamates by reaction of an alkyl amine containing 1 to 6 carbon atoms with a lower alkyl, alkali metal xanthate, the improvement comprising carrying out said reaction in the presence of palladium ions.

2. The process as claimed in claim 1, wherein said reaction is carried out at a temperature in the range of 50° to 90° C. for from ½ to 18 hours.

3. In a process for the production of an alkyl-isopropyl thionocarbamate by reaction of an alkyl amine containing 1 to 6 carbon atoms with an alkali metal isopropyl xanthate, the improvement comprising carrying out said reaction in the presence of a dissolved catalyst selected from the group consisting of palladium and nickel ions.

4. The process as claimed in claim 3, wherein said catalyst is nickel, and said reaction is carried out at a temperature in the range of 60° to 90° C. for from 4 to 18 hours.

5. The process as claimed in claim 3, wherein said catalyst is palladium, and said reaction is carried out at a temperature in the range of 50° to 90° C. for from ½ to 18 hours.

6. A process for the production of dialkyl thionocarbamates comprising:

reacting a stoichiometric excess of an alkyl amine having from 1 to 6 carbon atoms with an aqueous solution of a lower alkyl, alkali metal xanthate at a temperature in the range of 50° to 90°C. for from ½ to 18 hours in the presence of palladium ions; and separating the resulting organic and aqueous phases and recovering said thionocarbamate from said organic phase.

7. The process as claimed in claim 6, wherein said excess is in the range of about 20 to 100%.

8. The process as claimed in claim 6, wherein the amount of said palladium present is at least 0.002 mols per mol of xanthate.

9. The process as claimed in claim 6, wherein said xanthate solution is a technical grade xanthate containing dissolved carbon disulfide and no more than 2 percent free alkali.

10. A process for the production of an alkyl-isopropyl thionocarbamate comprising:

reacting a stoichiometric excess of an alkyl amine having from 1 to 6 carbon atoms with an aqueous solution of an alkali metal isopropyl xanthate at a temperature in the range of 60° to 90° C. for from 4 to 18 hours in the presence of nickel ions; and separating the resulting organic and aqueous phases and recovering said thionocarbamate from said organic phase.

11. The process as claimed in claim 10, wherein said excess is in the range of 20 to 100%.

12. The process as claimed in claim 10, wherein the amount of said nickel present is at least 0.01 mols per mol of xanthate.

13. The process as claimed in claim 10, wherein said xanthate solution is a technical xanthate containing dissolved carbon disulfide and no more than 1 percent free alkali.

* * * * *